Sept. 16, 1969   J. E. BERGE   3,467,401
AIR CHUCK
Filed May 5, 1966   3 Sheets-Sheet 1
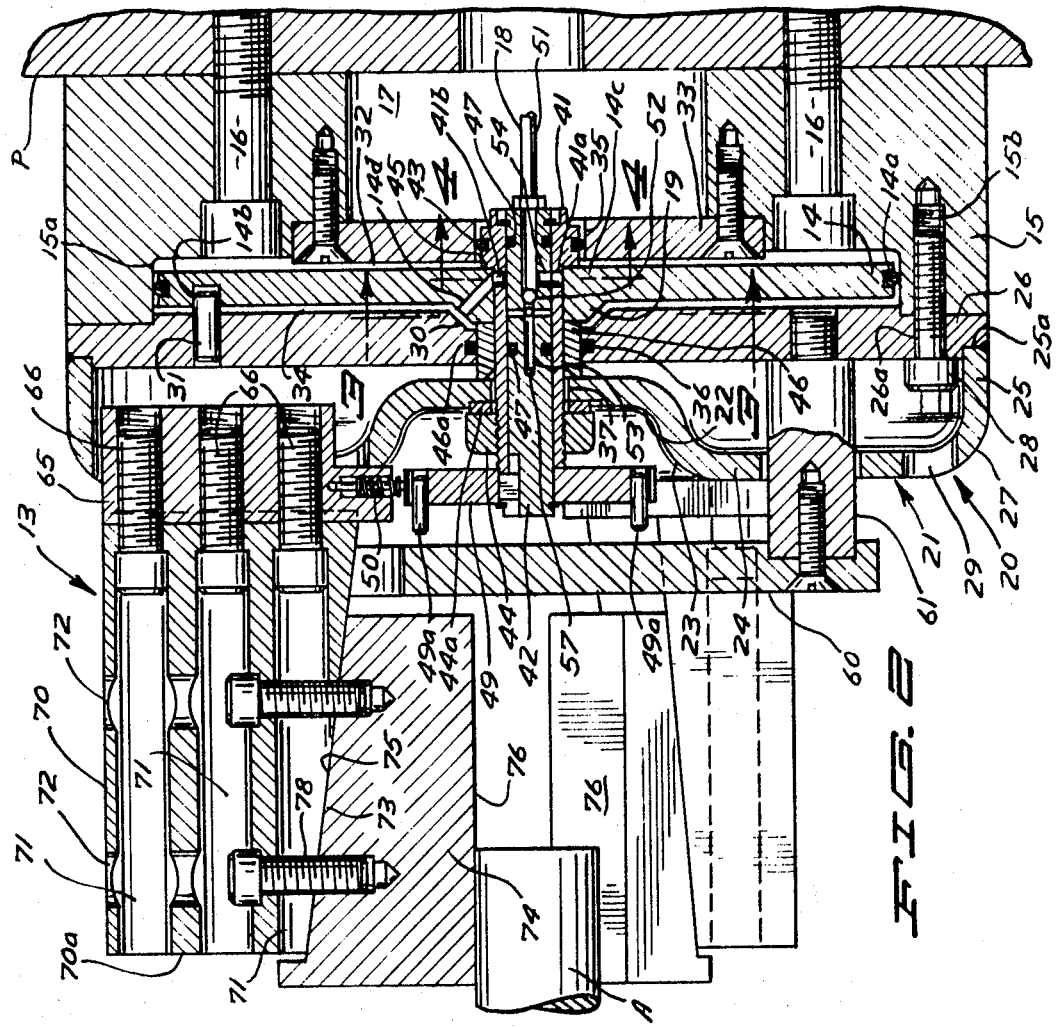
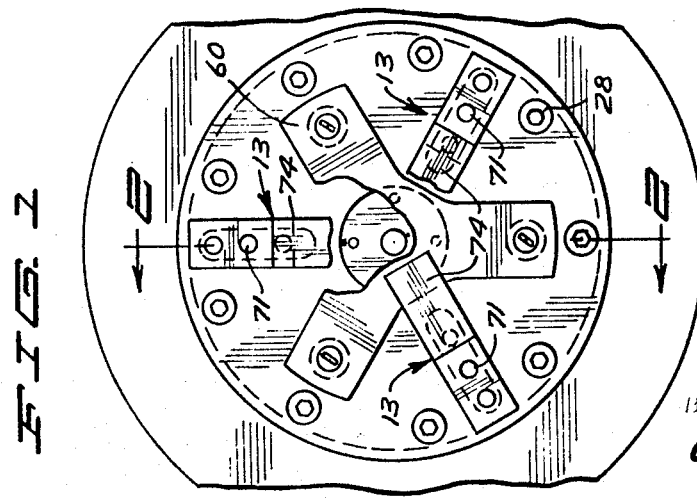
INVENTOR.
JESSE E. BERGE
BY
Adams & Cuayna
ATTORNEYS Sept. 16, 1969  J. E. BERGE  3,467,401
AIR CHUCK Filed May 5, 1966  3 Sheets-Sheet 2

INVENTOR.
JESSE E. BERGE
BY
Adams & Cwayna
ATTORNEYS

Sept. 16, 1969  J. E. BERGE  3,467,401
AIR CHUCK

Filed May 5, 1966  3 Sheets-Sheet 3

INVENTOR.
JESSE E. BERGE
BY
Adams & Cwayna
ATTORNEYS

United States Patent Office 3,467,401
Patented Sept. 16, 1969

3,467,401
AIR CHUCK
Jesse E. Berge, 20 E. 19th St., Minneapolis, Minn. 55403
Filed May 5, 1966, Ser. No. 554,931
Int. Cl. B23b *31/30, 31/10, 5/22*
U.S. Cl. 279—4                                        8 Claims

ABSTRACT OF THE DISCLOSURE

This disclosure relates to an air chuck utilized for clamping of articles for precision machining thereof and includes a deformable plate member to which the jaws of the chuck are affixed with a movable piston mounted therebehind for shifting the position of the plate member to either open or expand the jaws by providing a longitudinal movement to the center portion of the plate member. The valving structure for introducing air pressure to either side of the piston is entirely incorporated within the unit and includes a rotatable air directing member to direct air pressure to either side of the piston whereby the piston will move outwardly or inwardly and which rotatable member affords communication to both sides of the piston for introducing pressure to one side of the piston while relieving pressure from the other side thereof while providing a single pressure fitting for the introduction of air pressure to the rotatable member. An indexing system is also included for proper indexing of the rotatable member with regard to the passages directing air to and relieving air from the respective sides of the piston.

---

This invention relates generally to machine tool accessory equipment and more particularly to a chucking device for holding articles for proper machining thereof.

In the past several forms of chucking devices for machine operations have been provided and these include what are commonly known as air chucks. Applicant through this invention has provided an air chuck which is actuated by pressurized air from a remote source and which includes the utilization of the inherent strength of spring steel to achieve chucking pressure on either internal or external surfaces. In the chucking device provided by applicant, the strength of the spring steel is utilized as one of the chucking or holding forces and the pressurized air is utilized as an additional chucking or holding force.

The chuck provided by applicant includes a movable piston member to actuate a certain spring steel housing having chucking jaws mounted thereon such that the housing is moved from a normal position into either an expanded or contracted position for insertion of parts into the jaws and after such insertion the direction of piston movement is controlled to reverse the force exerted by the housing to exert a cumulative force of the air and the housing upon the part.

The control mechanism for applicant's chucking device is extremely unique and incorporates a multiposition valve member controlling air flow to and from both sides of the actuating piston such that positive control of the force exerted on a part to be machined is provided.

The chuck also incorporates a unique jaw device for positively holding articles for machining which is adjustable to accommodate tolerance and roundness variations and is easily changed to accommodate articles of various sizes or which require varied clamping.

It is therefore an object of applicant's invention to provide a chucking device for machine tools and the like which is operated through the application of pressurized air thereto.

It is a further object of applicant's invention to provide a chucking device which combines the inherent memory strength of a steel member and an actuating force of pressurized air to positively hold articles for machining therein.

It is a further object of applicant's device to provide an air powered chucking unit which incorporates a new and unique spool valve control mechanism to control the flow of air into the various elements thereof which air positively controls the closing and opening action of the chuck.

It is a further object of applicant's invention to provide a new and unique chucking jaw structure for an air chuck and the like which permits interchangeability between various sizes and types of jaws and which permits a certain degree of adjustability for various sized articles to be chucked within a single set of jaws.

It is a further object of applicant's invention to provide an air chucking device which is particularly designed to be completely balanced to permit accuracy unattainable with unbalanced chucks and is therefore useable for balancing machines.

It is a further object of applicant's invention to provide an air chuck device for holding articles to be machined which provides a two-way full powered air control system while requiring only one inlet air line to the unit.

These and other object and advantages of my invention will more fully appear from the following description made in connection with the accompanying drawings, wherein like reference characters refer to the same or similar parts throughout the several views, and in which:

FIG. 1 is a partial front elevation showing a chuck incorporating the concepts of applicant's design mounted on a machine tool such as a lathe or the like;

FIG. 2 is a vertical section taken substantially along line 2—2 of FIG. 1;

Figure 3:
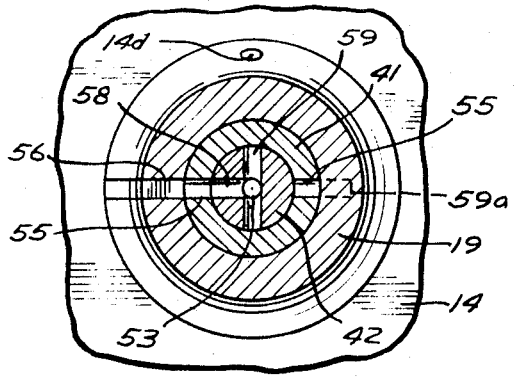
FIG. 3 is a transverse section taken substantially along line 3—3 of FIG. 2 illustrating a first section of the valving unit of the chuck.

In accordance with the accompanying drawings a chuck 13 incorporating the concepts of applicant's invention is arranged for mounting on a machine tool or the like which tool may include a mounting plate or face plate P carried on a rotatable spindle.

The principle behind the chuck 13 is to provide a holding force consisting of either the inherent memory of steels or other materials to return to a normal position or the combined force of air acting against the memory unit to first urge the chuck in one direction permitting placement of an article to be machined therein and then reversing the air such that the combined force including the natural memory return of the material to a normal position and the force of the applied air will positively hold the article in proper position.

The chuck form illustrated in FIG. 2 is arranged to clamp on an exterior surface of an article A to be machined and positively hold the same between the jaws of the unit. It should be obvious and it is well known by those skilled in the art that an air chuck is designed for minimum opening and closing and therefore a plurality of various ranged chuck members are supplied therewith to accommodate articles of various sizes.

In order to accomplish the opening and closing of the chuck jaw members a movable piston 14 is provided having a seal 14a on an exterior circumferential surface thereof which piston 14 is arranged for reciprocating movement within a cylinder 15a of a mounting block 15. In the form shown mounting block 15 is provided with attachment means such as cap screws 16—16 for positively attaching the same to a plate P of the machine tool and which mounting plate 15 further provides a central passage 17 therethrough for the passage of a pressure air line 18 through the spindle of the machine tool into the chuck assembly. Mounting plate 15 defines the cylinder portion 15a on one end thereof which cylinder portion, due to limited movement required in the chucking device is of a substantially short stroke. As illustrated in FIG. 2, piston 14 is centrally arranged within the cylinder 15a and consists essentially of a flat plate portion having a raised frusto-conical section 19 generally centrally thereof which frusto-conical section 19 is provided with a plurality of air passage therethrough which passages will be more further described hereinafter.

The chucking housing designated in its entirety 20 includes a first preformed spring housing plate member 21 generally arcuate in shape having a central depressed portion 22 extending outward to a smoothly curved forwardly, longitudinally extending with a second radially extending portion 23 to an outward portion 24 evolving therefrom. The outward radial section 24 is then formed back upon itself to provide a rearwardly, longitudinally extending flange portion 25. In the form shown the endmost portion 25a of the circumferential flange 25 is securely connected to a backing plate 26 to form an integral unit therewith. Spring housing member 21 is of a material having a high memory factor which would include materials such as spring steel and the like. A definition of memory factor means that the material will automatically return to the shape illustrated in FIG. 2 when a bending force tending to move the unit from its original shape is removed therefrom. The particular configuration for this spring housing or clamping plate 21 permits a certain bending motion about the intersecting corner 27 between the radially extending portion 24 and the rearwardly extending flange member 25. This clamping plate then in effect bends slowly about this corner 27 to permit longitudinal shifting of the innermost depressed portion 22 which longitudinal shifting will provide either a radially outward displacement of the jaw portions or a radially contracting motion for the jaw portions anchored to the plate 21. The particular shape of plate 21 is substantially stronger than a flat plate but while being substantially stronger will remain more flexible than a flat plate of similar dimension.

Backing plate 26 in the form shown is arcuate in shape and is attached to the rearwardly extending end 25a of flange 25 entirely therearound to provide a substantially rigid member. This unit then consisting of plate 21 and plate 26 is securely mounted to the mounting plate 15 through a plurality of cap screws 28 or the like which cap screws pass through clearance apertures 26a in plate 26 and into threaded apertures 15b in mounting plate 15. Likewise correspondingly alinged clearance apertures 29 must be provided through the memory or spring plate 21 such that the cap screws 28 may pass therethrough for connecting the assembly to the mounting plate 15.

Plate 26 is provided wtih a central frusto-conical relief 30 in aligned relation to the frusto-conical section 19 on piston member 14. This relieve portion 30 then permits a certain degree of reciprocation of the piston 14 within the cylinder 15a as will be hereinafter explained.

In order to further cooperate with and accommodate the reciprocation of piston 14 within cylinder 15a a pin member 31 is provided in plate 26 with a pin clearance aperture 14b provided in piston 14 such that the piston 14 will only reciprocate in a straight line relation within the cylinder 15a and will not be free to rotate within this cylinder 15a. This relationship becomes particularly important in order to control the valving through the piston 14 to accommodate air introduction into both sides of the piston 14.

As further illustrated in FIG. 2, a cavity 32 is provided on what may be termed the rearward side of piston 14 between the rear flat surface thereof and a valve mounting plate 33 which plate 33 is received and located in the main mounting plate 15. A second cavity 34 is provided between the frontmost surface of piston 14 and the backing plate 26 to permit air to be introduced therebetween and with this dual cavity arrangement it should be obvious that air may be introduced to either side of the piston 14 to control its placement within the cylinder 15a and through the structure which will be hereinafter described, control the position of the clamping plate 21 and the various article holding jaws connected thereto.

In line apertures 35, 36 and 37 are provided respectively in the valve mounting plate 33, backing plate 26 and the spring clamping plate 27. The purpose of such apertures is to provide an in line longitudinal passage for receiving a control valve mechanism generally designated 40 therein to control the flow of air into the chuck and thereby control the clamping position of the clamp plate 21. The entire valve construction 40 generally includes a first outer sleeve member 41 and an inner air controlling member 42. Outer member 41 is sealingly provided within passage 35 through the incorporation of a sealing ring 43 therearound to engage with the inner surface of passage 35 while maintaining freedom of longitudinal movement therewithin. The opposite end of the outer section 41 is provided with a threaded segment for capturing engagement with a nut element 44 which nut element is arranged to abut through an intermediate washer member 44a against the innermost surface 22 of the spring clamp plate 21. In this manner it should be obvious that if a rearward force is applied to the outer section 41 of valve 40 this force will be transmitted to the spring clamp plate 21 to draw the same rearwardly thus radially contracting any jaws that may be placed thereon. In order to afford this rearward motion of the outer valve section 41 a shoulder 45 is provided thereon to abut with the rear surface of piston 14 such that as piston 14 moves rearwardly the outer portion 41 of the valve will be forced therealong thus drawing the clamping plate 21 rearwardly therewith.

In order to afford forward motion of the spring clamping plate 21b a bushing 46 is arranged in passage 36 of backing plate 26 and is sealed therein through seal 46a but is free to longitudinally move with piston 14. Bushing 46 abuts with the frusto-conical extending portion 19 of piston 14 and is in the position shown in FIG. 2 in abutment with the rearward surface of spring clamping plate 21. It should be obvious that when piston 14 is moved forwardly due to air pressure being introduced into cavity 32 bushing 46 and at least the central portion of plate 21 will be shifted longitudinally forward thus expanding any jaws that may be located thereon. Outer portion 41 of the valve 40 is likewise provided with air flow apertures therethrough which apertures will be further described hereinafter in conjunction with the air flow through the valving system.

An inner air valve member 42 is sealingly arranged within the outer valve member 41 by providing at least a pair of O-ring or other sealing member 47 at spaced longitudinal intervals thereon and inner valve member 42 is substantially longer than the outer valve section 41 having the forwardmost end thereof exposed such that a control plate 49 or the like may be fixedly mounted thereon to control the rotative position thereof to control the air flow into the chucking system.

A plurality of pin members 49a are arranged on the control plate 49 and through the use of a spanner wrench or the like the position of the valve 42 may be controlled. Detent openings may be provided on the outer periphery of control plate 49 with means such as the spring loaded ball member 50 arranged on one of the jaws to positively position the control plate 49 at predetermined intervals.

In order to introduce air into the valve structure 40 an inlet line 51 is provided into the internal valve member 42 and air is admitted to the inner valve member 42 to the position of a sealing ball member 52 arranged therein. A further inwardly extending passage 53 permits exhaust air to leave the unit and these holes 51 and 53 are illustrated as being longitudinally aligned for purposes of machining only. There is no communication between passage 53 and inlet line 51.

Figure 4:
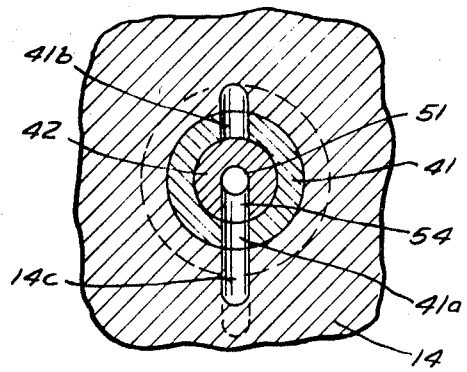
FIG. 4 is a transverse section taken substantially along line 4—4 of FIG. 2 illustrating a second section of the valving portion of the chuck.

To control the inlet air, a first radially extending passage 54 communicates with inlet passage 51 and this is the only passage to direct air to either the rear cavity 32 or front cavity 34 on opposite sides of the piston. As illustrated, apertures 41a, 41b are provided on outer valve member 42 in aligned relation to passage 54 and are diametrically opposed. An inlet passage 14c is provided to feed from radial passage 41a through the piston plate 14 to the rear cavity 32 and likewise an angularly arranged passage 14d is provided to communicate with passage 41b to feed air to the front cavity 34 of the piston 14. The position illustrated in FIG. 2 is exactly the same valving position as illustrated in FIGS. 3 and 4 to permit air to enter into conduit and passage 18 and 51 to be directed to the rear side of the piston 14 into cavity 32. As air is fed to rear cavity 32 it is necessary to relieve air from cavity 34 on the frontmost surface of piston 14 and to obtain this air relief passage 53 must be connected to the frontmost surface of piston 14. As illustrated in FIG. 3, a pair of diametrically opposed passages 55—55 are arranged through the outer valve member 41 and a single passage 56 is defined through the frusto-conical portion 19 of piston 14. Air from cavity 34 is free to enter into passage 56 and pass into the longitudinal extending passage 53. Naturally this air must still be relieved from passage 53 and a diametrically arranged passage 57 is provided at the endmost penetration of passage 53 such that air is free to exit from the valving unit 40 between the backing plate 26 and the spring clamping plate 21. It should be obvious that this air could likewise pass entirely longitudinally through the inner valve member 42 to exit at the forwardmost end thereof.

As illustrated in FIG. 3, three longitudinally aligned apertures are provided within the innermost valve member 42 and these passages are designated respectively 58, 59; with passage 59 passing diametrically through the inner valve 42. In this particular position air is now being introduced into the rearward side of piston 14 and the piston has been forced forwardly pushing the intermediate portion 22 of clamping plate forward thus opening the jaws connected to the spring clamping plate 21. During the same cycle air is free to exhaust from the front of the piston 14 through passages 56, 53 and 57. This situation would permit a work piece to be inserted or removed from the jaws if the exterior surface of the work piece were the clamping surface.

Figure 5:
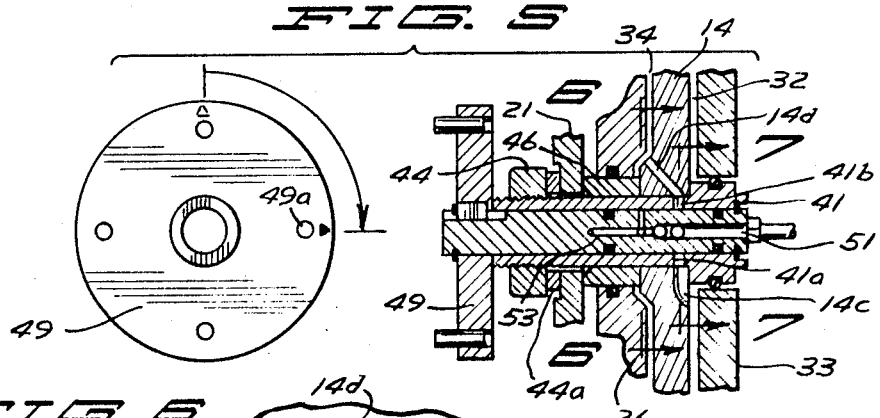
FIG. 5 is a front and side sectional view of the valve portion of the chuck.
Figure 6:
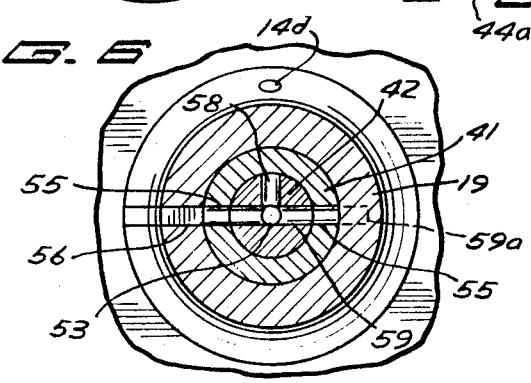
FIG. 6 is a vertical section taken substantially along line 6—6 of FIG. 5.
Figure 7:
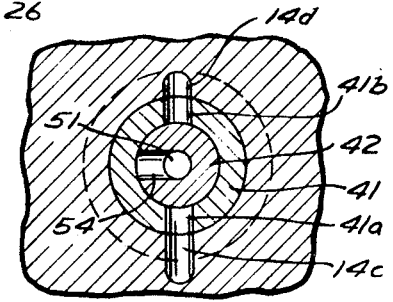
FIG. 7 is a vertical section taken substantially along line 7—7 of FIG. 5.
Figure 8:
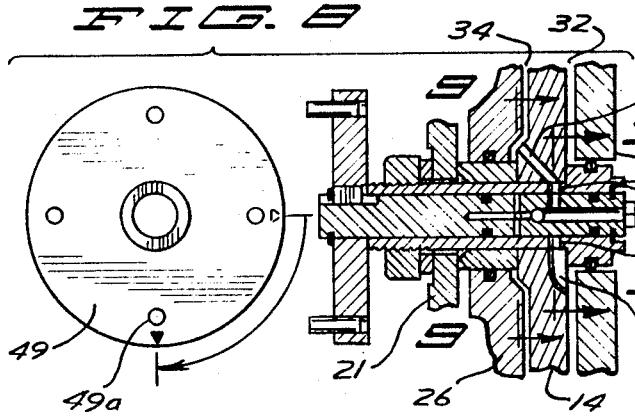
FIG. 8 is a view similar to that of FIG. 5 illustrating the valve portion rotated 90° from the position illustrated in FIG. 5.
Figure 9:
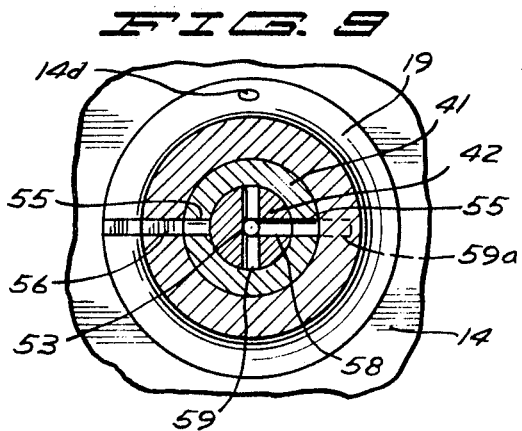
FIG. 9 is a vertical section taken substantially along line 9—9 of FIG. 8.
Figure 10:
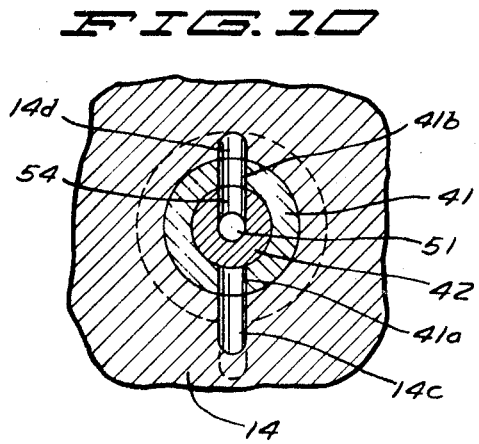
FIG. 10 is a vertical section taken substantially along line 10—10 of FIG. 8.

The next position of the valving structure is illustrated in FIG. 5 wherein the unit has been rotated 90°. This valving and port condition is now illustrated in FIGS. 6 and 7 where FIG. 7 illustrates that no high pressure air is being fed into either the front or rear of the piston 14 but rather air is only free to exit from the front cavity 34 and the rear cavity 32 of the unit through the passage of air from the front portion 34 through passage 56 into the internal longitudinal passage 53 and likewise from the rare cavity 32 into the passage 59a which is angularly cut through the frusto-conical portion 19 of piston 14 to communicate with the rear surface of piston 14 and cavity 32. It should be obvious that this is actually a free position in which plate 21 is free to return to a normal position from either a rearwardly or forwardly displaced position without requiring any air to accomplish this movement.

When the control plate 49 is again rotated 90° the position of the valve 40 is such that air will be introduced into the forward cavity 34 of the piston 14 and force the same rearwardly to retract the middlemost portion 22 of plate 21 thus radially contracting any jaws that may be thereon. In order to accomplish this introduction of air into the frontmost cavity 34 it is necessary that valve 42 portion be rotated to allow communication between radially extending passage 54, passage 41b and passage 14d through piston 14. At the same time it is necessary that air must be relieved from rear cavity 32 by allowing the same to pass into the longitudinal passage 53 from the angularly formed passage 59a communicating with rear piston cavity 32. This application of air in front of piston 14 of course forces the same rearwardly closing any jaws that may be mounted on the clamping plate 14.

A further 90° rotation will produce another dual relief position and a further 90° rotation will produce the position shown in FIG. 2 introducing air into the rear cavity 32 behind piston 14.

In one form of the invention a work stop piece 60 substantially trifurcated in shape may be provided in forwardly spaced relation from the control plate 49 of the valve unit 40. This work stop piece 60 is primarily designed to abut with work that may be inserted between the jaws when chucking externally about the article and as shown may be held to the backing plate 26 through a standoff 61 and nut and bolt arrangement.

In order to properly hold the clamping jaws unto the clamp spring plate 21 a certain interchangeable jaw system has been provided by applicant. In the form shown, a first jaw mounting pad 65 is securely mounted unto the spring plate 21 and is provided with a plurality of threaded apertures 66 therein. The first portion of these jaws includes a pad member 70 having a plurality of longitudinally extending apertures 71 therein to receive attachment bolts for joining the pad 72 to the jaw base 65. A plurality of radially extending apertures 72 are likewise formed in each of the pads 70 to permit cap screws to be inserted therein. In the form shown for external chucking about a member, the internal surface 73 of the jaw pad 70 is tapered at a predetermined angle. The jaw members themselves designated 74 are generally angularly surfaced on one side 75 thereof which side will agree with the tapered surface 73 on the jaw pad 70 which tapers will provide a substantially flat surface on the innermost surface 76 of jaws 74 for clamping an article A therebetween. A shoulder portion 77 is provided on the outermost edge of the tapered section 75 such that this shoulder may abut with the top or outermost end 70a of pad 70. Abuttment shoulder 77 likewise permits certain adjustability of the jaw block 74 with respect to the jaw pad 70 in that it is possible to place a shim between the extending shoulders 77 and the top 70a of the pad 70 to raise the same thereby increasing the available diametrical distance between the inner surfaces 76 of the jaw blocks 74 utilized. For this particular reason the capturing screws 78 receivable into aperture 72 of pad 70 are what may be termed a free-fit to permit a certain amount of sliding between the tapered surfaces 73 and 75.

Figure 11:
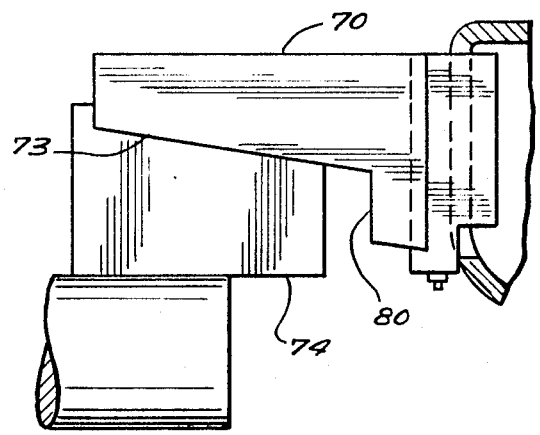
FIG. 11 is a side elevation of one type of jaw used in the chuck.
Figure 12:
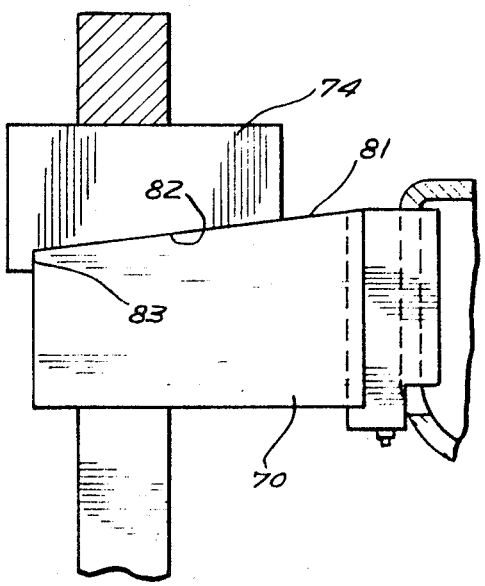
FIG. 12 is a modified view of a jaw used with the chuck particularly for chucking on an interior surface of an article.

Two other forms of jaw members are illustrated in FIGS. 11 and 12. The illustration in FIG. 11 being again for an external clamping situation wherein the size of the element being clamped is substantially greater than that illustrated in FIG. 2. This particular size range is provided for by providing a reducing shoulder portion 80 on the standard jaw base or pad 70 thus moving tapered surface 73 outwardly with all other portions of both the jaw 74 and pad 70 being the same as that illustrated in FIG. 2.

In FIG. 12 an internal clamping device is provided wherein the pad 70 has a taper 81 on the outside surface thereof and the jaw member 74 is provided with a corresponding taper 82 on the internal surface thereof. Again a shoulder 83 is provided for minimum adjustment of the clamping diameter.

Each of the jaw structures incorporates the same basic concepts which are the mating tapered surfaces with the overlying shoulder which may be moved longitudinally by shims placed thereunder to adjust the clamping space between jaws.

The jaw structures all provide a positive clamping action for articles and all jaws are easily interchanged due to positive locating structures built into the jaw bases 66 and the jaw pads 70. This is most important from a manufacturing standpoint as the setup time is substantially reduced when a jaw change is required. Also the adjustability of jaw ranges due to the shoulder shim arrangement affords positive and precise holding unattainable with other jaw structures on the market.

The operation of the unit should be obvious to one skilled in the art and is as follows. Assuming the spring plate to be in a normal position and an article is to be clamped about the periphery thereof, air is introduced to the rear of the piston forcing the spring plate longitudinally outward and the jaws radially outward to receive the article. The valve is now rotated to permit air relief from both sides of the piston and the spring plate will from memory return to a normal position clamping the article therein. A further rotation of the valve now applies air to the front of the piston and applies a further drawing force to the plate thus increasing the clamping action. Release is obtained by a 180° rotation returning the valve to direct air to the rear of the piston and open the jaws.

The operation hereinabove discussed would be used for articles which require heavy clamping such as difficult to hold or heavy parts. When used as discussed, an actual fail-safe feature is provided in that a combined clamping action of memory and air is utilized and if the air source should be cut off, the memory clamp will be sufficient to hold most articles. In most applications the operator will find that the memory clamping portion will be sufficient and will only utilize this aspect of the chuck.

It should be obvious that applicant has provided a new and unique air controlled chuck utilizing a single air source which applies a combined clamping force to an article.

It will, of course, be understood that various changes may be made in the form, details, arrangements and proportion of parts without departing from the scope of the invention, which generally stated consists in the matter set forth in the appended claims.

What I claim is:

1. A device clamping articles for machining thereof including:
    (a) a housing member arranged for attachment to a machine tool;
    (b) a spring plate element positively held to said housing member at at least selected points thereof said plate characterized by its ability to return to a normal position and having at least predetermined areas thereof shiftable from a normal position;
    (c) a plurality of article holding jaws detachably mounted on said plate element for movement therewith whereby the radial distance between jaws will increase or decrease corresponding to the movement of said plate element;
    (d) a cylinder provided in spaced relation to said plate element;
    (e) a piston member mounted for reciprocation within said cylinder;
    (f) means connecting said piston and said plate element whereby movements of said piston are transmitted to said plate; and
    (g) a valve member carried by said piston having:
        (1) a single inlet to receive a pressurized medium from a remote source;
        (2) at least one outlet passage defined by said valve member to direct the pressurized medium; and
        (3) means for shifting said valve member to direct the pressurized medium to a selected side of said piston.

2. The structure set forth in claim 1 wherein said valve member includes a spool valve control section having a plurality of flow passages therethrough at predetermined locations; at least one of said passages directing inlet flow to one side of said piston while receiving exhaust flow from the other side of said piston through another of said passages.

3. The structure set forth in claim 2 wherein at least another set of passages is provided to exhaust from both sides of said piston whereby positioning forces are removed from said spring plate element and said element is free to return to normal unstressed position.

4. The structure set forth in claim 1 wherein said spring plate element is substantially arcuate in shape and is provided with a rearwardly extending flange member which flange is positively connected to said housing member.

5. The structure set forth in claim 1 and
    (a) said piston provided with flow passages defined therein directed therethrough to both sides of said piston; and
    (b) said valve member outlet passage arranged to communicate selectively with said piston passages.

6. The structure set forth in claim 5 and said valve member including:
    (a) a housing carried by said piston defining passages therethrough communicating with said piston passages; and
    (b) a flow controlling member rotatably mounted in said housing, said controlling member defining said single inlet and said outlet passage.

7. The structure set forth in claim 6 and said flow controlling member including exhaust flow passages arranged and constructed to receive from both sides of said piston in opposition to the position and flow from said outlet passage.

8. The structure set forth in claim 6 and said flow controlling member extending through said housing providing an actuating end with indexing means thereon for positioning said passages therein with said piston passages.

References Cited

UNITED STATES PATENTS

| | | | |
|---|---|---|---|
| 2,821,400 | 1/1958 | Howhart | 279—1 |
| 2,890,889 | 6/1959 | Work | 279—4 X |
| 2,958,532 | 11/1960 | Benjamin | 279—4 |

ROBERT C. RIORDON, Primary Examiner

D. R. MELTON, Assistant Examiner